United States Patent
Deng et al.

(10) Patent No.: US 11,245,292 B2
(45) Date of Patent: Feb. 8, 2022

(54) WIRELESS CHARGING DEVICE AND CHARGING SYSTEM

(71) Applicant: BOE TECHNOLOGY GROUP CO., LTD., Beijing (CN)

(72) Inventors: Wei Deng, Beijing (CN); Jun Yang, Beijing (CN); Yanfu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 173 days.

(21) Appl. No.: 16/533,456

(22) Filed: Aug. 6, 2019

(65) Prior Publication Data
US 2020/0161908 A1    May 21, 2020

(30) Foreign Application Priority Data
Nov. 16, 2018    (CN) .......................... 201811369164.6

(51) Int. Cl.
*H02J 50/90* (2016.01)
*H02J 50/10* (2016.01)
*H02J 7/02* (2016.01)

(52) U.S. Cl.
CPC .............. *H02J 50/90* (2016.02); *H02J 7/025* (2013.01); *H02J 50/10* (2016.02)

(58) Field of Classification Search
CPC ..................................................... H02J 50/90
USPC ......................................................... 320/108
See application file for complete search history.

(56) References Cited

U.S. PATENT DOCUMENTS

| | | | | |
|---|---|---|---|---|
| 2009/0153098 A1* | 6/2009 | Toya | ...................... | H02J 7/0045 320/108 |
| 2014/0333144 A1* | 11/2014 | Ikeuchi | ................... | H02J 5/005 307/104 |
| 2018/0323660 A1* | 11/2018 | Lee | ......................... | H02J 7/025 |

FOREIGN PATENT DOCUMENTS

| | | |
|---|---|---|
| CN | 106357010 | 1/2017 |
| CN | 106451631 | 2/2017 |
| CN | 107276254 | 10/2017 |
| CN | 108407650 | 8/2018 |

OTHER PUBLICATIONS

1st Office Action dated Dec. 24, 2019 for Chinese Patent Application 201811369164.6.

* cited by examiner

*Primary Examiner* — Edward Tso
*Assistant Examiner* — Ahmed H Omar
(74) *Attorney, Agent, or Firm* — Thomas | Horstemeyer, LLP (57) ABSTRACT

The present disclosure provides a wireless charging device including a transmitting coil, a power collection component, a position acquiring component, a driving component and a control component. The transmitting coil is configured to transmit electrical energy to a receiving coil of a terminal. The power collection component is configured to acquire state parameters of the transmitting coil and the receiving coil in a charging state in real time. The position acquisition component is configured to acquire position information of the receiving coil sent by the terminal and position information of the transmitting coil. The driving component is configured to drive the transmitting coil to move. The control component is configured to control the driving component to drive the transmitting coil to move according (Continued)

to the position information of the receiving coil, the position information of the transmitting coil, and the state parameter.

18 Claims, 4 Drawing Sheets

WIRELESS CHARGING DEVICE AND CHARGING SYSTEM

CROSS REFERENCE TO RELATED APPLICATIONS

The present application is based upon, and claims the benefit of and priority to, Chinese Patent Application No. 201811369164.6, filed on Nov. 16, 2018, the entire disclosure of which is hereby incorporated by reference as a part of the present application.

TECHNICAL FIELD

The present disclosure relates to the field of electronic technologies and, in particular, to a wireless charging device and a charging system.

BACKGROUND

With the rapid development of the information age, applications of electronic products are more and more widely used, and portable electronic products bring great convenience to people. However, the power capacity of electronic products is limited, and electronic products need to be charged when the amount of power is insufficient. In general, a charging cable is directly connected to the electronic product for charging, but it is inconvenient to carry the charging cable when traveling. Therefore, wireless charging technology of electronic products has become the focus of research at home and abroad.

The existing wireless charging device generally includes a transmitting coil, and the electronic device to be charged includes a receiving coil. The transmission of electrical energy can be achieved through the electromagnetic induction of the transmitting coil and the receiving coil.

It should be noted that the information disclosed in the Background section above is only for enhancing the understanding of the background of the present disclosure and thus, may include information that does not constitute prior art known to those of ordinary skill in the art.

SUMMARY

An object of the present disclosure is to provide a wireless charging device and a charging system.

According to an aspect of the present disclosure, a wireless charging device is provided, including:

a transmitting coil configured to transmit electrical energy to a receiving coil of a terminal;

a power collection component configured to acquire state parameters of the transmitting coil and the receiving coil in a charging state in real time;

a position acquisition component configured to acquire position information of the receiving coil sent by the terminal and position information of the transmitting coil;

a driving component configured to drive the transmitting coil to move;

a control component configured to control the driving component to drive the transmitting coil to move according to the position information of the receiving coil, the position information of the transmitting coil, and the state parameter until the state parameter is within a preset range.

In an exemplary embodiment of the present disclosure, the terminal includes a marking component, and the wireless charging device further includes:

a detecting component configured to detect the marking component and generate a control signal when the marking component is detected;

the control component is configured to determine an offset direction of the transmitting coil relative to the receiving coil according to the position information of the receiving coil and the position information of the transmitting coil in response to the control signal.

In an exemplary embodiment of the present disclosure, the position acquisition component further includes:

a storage module configured to store reference device information of a plurality of terminals and position information of the receiving coil of each of the terminals;

a comparison module, configured to receive device information sent by one of the terminals, compare the device information with the reference device information, and read position information of a receiving coil corresponding to the reference device information when one of the reference device information includes the device information.

In an exemplary embodiment of the present disclosure, the comparison module is configured to acquire the position information of the receiving coil sent by the terminal when the device information is not included in the reference device information, and store the device information in the storage module to serve as reference device information corresponding to the terminal.

In an exemplary embodiment of the present disclosure, the marking component is a light emitting element and the detecting component is a photodetecting element.

In an exemplary embodiment of the present disclosure, the state parameter includes a ratio of a power of the receiving coil to a power of the transmitting coil.

In an exemplary embodiment of the present disclosure, the preset range is 70% to 100%.

In an exemplary embodiment of the present disclosure, controlling the driving component to drive the transmitting coil to move according to the position information of the receiving coil, the position information of the transmitting coil, and the state parameter until the state parameter is within a preset range includes:

determining an offset direction of the transmitting coil relative to the receiving coil according to the position information of the receiving coil and the position information of the transmitting coil; and controlling the driving component to drive the transmitting coil to move along the opposite direction of the offset direction until the state parameter is within the preset range.

In an exemplary embodiment of the present disclosure, the position information of the receiving coil includes first coordinate information of the receiving coil in a first preset coordinate system; and the position information of the transmitting coil includes second coordinate information of the transmitting coil in a second preset coordinate system;

the determining an offset direction of the transmitting coil relative to the receiving coil according to the position information of the receiving coil and the position information of the transmitting coil includes:

determining an offset direction of the transmitting coil relative to the receiving coil according to the first coordinate information, the second coordinate information, and a positional relationship between the first preset coordinate system and the second preset coordinate system direction.

In an exemplary embodiment of the present disclosure, an origin of the first preset coordinate system is located at a center of the receiving coil, and an origin of the second preset coordinate system is located at a center of the transmitting coil.

According to an aspect of the present disclosure, a charging system is provided, including:

a terminal, including a receiving coil;

a wireless charging device according to any of the above.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

Wherein, 100, a wireless charging device; 1, a transmitting coil; 2, a power collection component; 21, an acquisition module; 22, a collection module; 3, a position acquisition component; 31, a storage module; 32, a comparison module; 5. a control component; 6, a detection component; 200, a terminal; 201, a marking component; 202, a storage component; 203, a communication component; 204, a receiving coil.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The described features, structures, or characteristics in one or more embodiments may be combined in any suitable manner. In the following description, numerous specific details are set forth to provide a full understanding of the embodiments of the present disclosure. However, one skilled in the art will appreciate that the technical solutions of the present disclosure can be practiced when one or more of the described specific details may be omitted or other methods, components, devices, steps, etc. may be employed. In other instances, well-known technical solutions are not shown or described in detail to avoid obscuring aspects of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

The terms "a" and "the" are used to indicate the presence of one or more elements/components, etc.; the terms "include" and "have" are used to indicate an open type meaning of including and means that there may be additional elements/components/etc. in addition to the listed elements/components/etc.

An embodiment of the present disclosure provides a wireless charging device 100, which can be configured to wirelessly charge a terminal 200. The terminal 200 can be a mobile phone, a tablet computer, etc., and of course another device which is not limited herein, can include a receiving coil 204.

Figure 1:
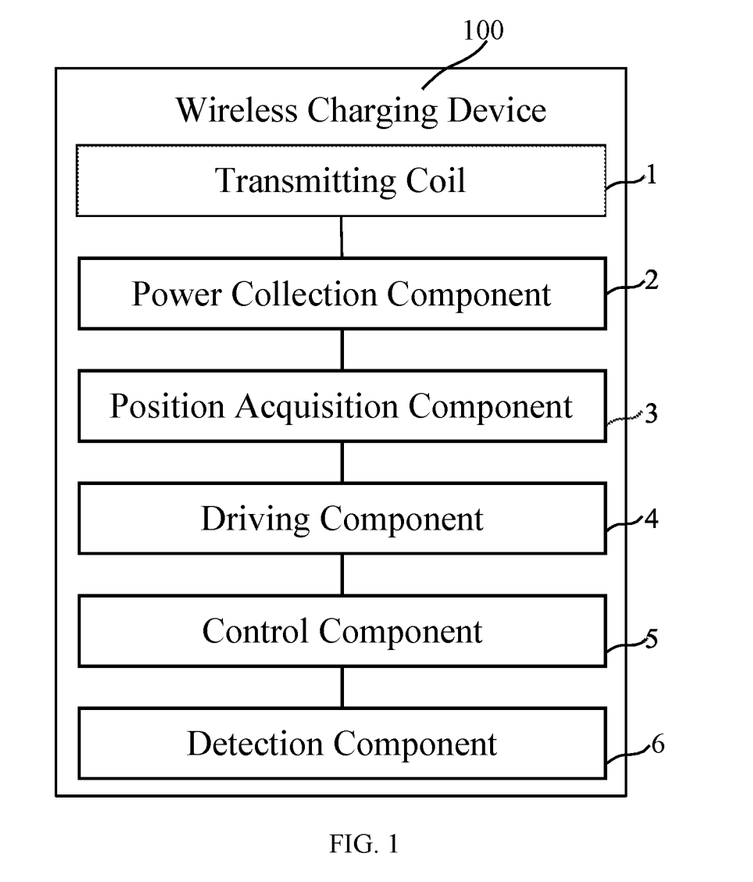
FIG. 1 is a schematic diagram of a wireless charging device according to an embodiment of the present disclosure.

As shown in FIG. 1, the device may include a transmitting coil 1, a power collection component 2, a position acquisition component 3, a driving component 4, and a control component 5, wherein:

the transmitting coil 1 can be configured to transmit electrical energy to a receiving coil 204 of a terminal 200;

the power collection component 2 can be configured to acquire state parameters of the transmitting coil 1 and the receiving coil 204 in a charging state in real time;

the position acquisition component 3 can be configured to acquire position information of the receiving coil 204 sent by the terminal 200, and position information of the transmitting coil 1;

the driving component 4 can be configured to drive the transmitting coil 1 to move; and the control component 5 can be configured to control the driving component 4 to drive the transmitting coil 1 to move according to the position information of the receiving coil 204, the position information of the transmitting coil 1, and the state parameter until the state parameter is within a preset range.

The wireless charging device 100 of the present disclosure can realize wireless charging by transmitting the power transmitted by the wireless charging device 100 to the terminal 200 through the transmitting coil 1 and the receiving coil 204 of the terminal 200; during this process, the position information of the receiving coil 204 sent by the terminal 200 and the position information of the transmitting coil 1 can be acquired by the position acquisition component 3. Also, the control component 5 can control the driving component 4 to drive the transmitting coil 1 to move along a direction close to the receiving coil 204 according to the position information of the receiving coil 204, the position information of the transmitting coil 1, and the state parameter collected by the power collection component 2, thereby reducing a distance of the wireless transmission and the dissipation of energy. When the transmitting coil 1 moves to a state where the state parameter is within a preset range, the charging efficiency can be maintained to be large, thereby improving the charging efficiency and then shortening the charging time.

According to an exemplary embodiment of the present disclosure, the respective component may be constituted by a corresponding circuit, for example, the power collection component 2 may include a power metering circuit and a signal conversion circuit and the like that are respectively configured. Alternatively, the various components may also be implemented by a processor, logic circuitry, etc. For example, power collection component 2 may include a processor that collects and/or receives power signals. Other components of the present disclosure may also be implemented in a similar manner and will not be described again herein.

Hereinafter, each part of the wireless charging device 100 of the embodiment of the present disclosure will be described in detail:

As shown in FIG. 1, the transmitting coil 1 can be configured to transmit electrical energy to a receiving coil 204 of a terminal 200. The transmitting coil 1 can transmit energy by means of electromagnetic induction with the receiving coil 204. Of course, energy can also be transmitted by other means. For example, energy transmission can be carried out in the form of radio waves, and energy transmission can also be carried out in the form of magnetic field resonance, which will not be enumerated here. The number of the transmitting coils 1 may be one or more coils, and the winding shape may be a circular shape, a rectangular shape or other irregular shapes, and the material thereof may be a hard metal or alloy material having strong electrical conductivity, such as copper, zinc-manganese alloy or the like, and the material of the transmitting coil 1 is not particularly limited as long as energy can be transmitted to the receiving coil 204. In order to facilitate the installation of the transmitting coil 1, the wireless charging device 100 may include a base, and the transmitting coil 1 is movably disposed in the base and movable in a plurality of directions within the base. The specific direction in which the transmitting coil 1 is moved is not particularly limited herein.

The power collection component 2 can be configured to acquire state parameters of the transmitting coil 1 and the receiving coil 204 in a charging state in real time. The state parameter may include the ratio of the power of the receiving coil 204 to the power of the transmitting coil 1. Of course, not limited thereto, the state parameter may also be a ratio of the current received by the receiving coil 204 and the current transmitted by the transmitting coil 1. The charging state can be a state in which the state parameter is greater than or equal to a certain minimum value.

In an embodiment, the state parameter may be a percentage of the power received by the receiving coil 204 and the power transmitted by the transmitting coil 1, and the charging state may be a state that the percentage of the power received by the receiving coil 204 and the power transmitted by the transmitting coil 1 is greater than or equal to 20% state. It should be noted that the state parameter may also be the percentage of the current received by receiving coil 204 and the current transmitted by the transmitting coil 1, correspondingly, the charging state may be a state that the percentage of the current received by the receiving coil 204 and the current transmitted by the transmitting coil 1 is greater than or equal to 20%, and the charging efficiency is higher as the percentage increases.

Figure 2:
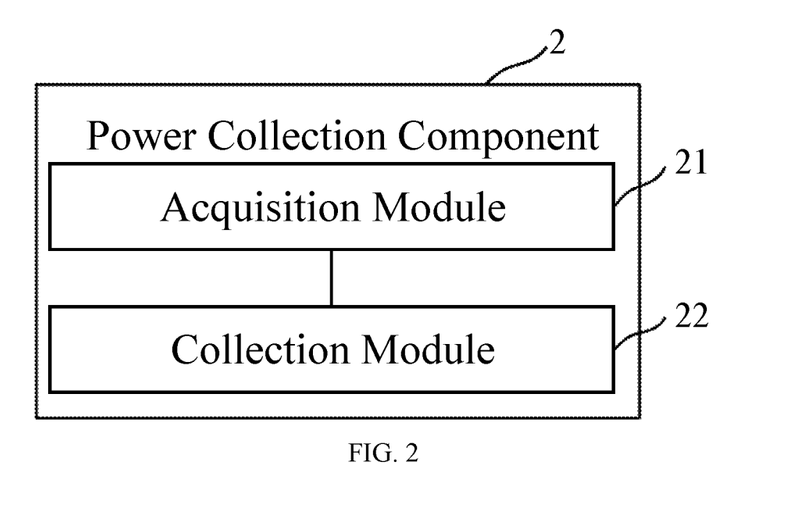
FIG. 2 is a schematic diagram of a power collection component of an embodiment of the present disclosure.

As shown in FIG. 2, the power collection component 2 can include an collection module 22 and an acquisition module 21, where the collection module 22 can be configured to detect the power transmitted by the transmitting coil 1, and the acquisition module 21 can be configured to acquire the received power of the receiving coil 204 transmitted by the terminal 200. The position acquisition component 3 can be configured to acquire the position information of the receiving coil 204 transmitted by the terminal 200 and the position information of the transmitting coil 1. The terminal 200 can detect the position of the receiving coil 204 and can generate the position information of the receiving coil 204. Also, the position acquisition component 3 can automatically acquire the position of the transmitting coil 1, and can generate the position information of the transmitting coil 1.

Specifically, the position information of the receiving coil 204 may include first coordinate information of the receiving coil 204 in the first preset coordinate system, and the position information of the transmitting coil 1 may include second coordinate information of the transmitting coil 1 in the second preset coordinate system. Determining an offset direction of the transmitting coil 1 relative to the receiving coil 204 according to the position information of the receiving coil 204 and the position information of the transmitting coil 1 includes determining an offset direction of the transmitting coil 1 relative to the receiving coil 204 according to the first coordinate information, the second coordinate information, and a correspondence relationship between the first preset coordinate system and the second preset coordinate system direction.

Figure 3:
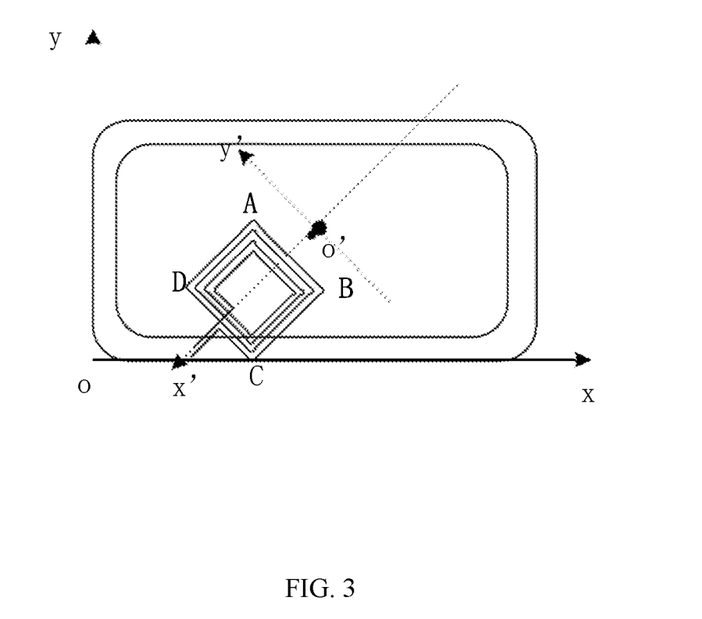
FIG. 3 is a schematic diagram of a first preset coordinate system and a second preset coordinate system according to an embodiment of the present disclosure.

For example, as shown in FIG. 3, the first preset coordinate system may be a spatial rectangular coordinate system xoy, where: o may be the origin of the coordinate system xoy, the horizontal axis of the coordinate system xoy may be x-axis, and the vertical axis may be y-axis.

The second preset coordinate system may be a spatial rectangular coordinate system x'o'y', where: o' may be the origin of the coordinate system x'o'y', the horizontal axis of the coordinate system x'o'y' may be the x-axis, the vertical axis may be the y-axis. The position information of the receiving coil 204 can be obtained by the position acquisition component 3, that is, the second coordinate information is information of known coordinates, and any four points A, B, C, and D can be taken as the second coordinate information from the receiving coil 204. Moreover, since the relative position of the origin of the coordinate system xoy and the coordinate system x'o'y' is determined, the first coordinate information corresponding to the four points A, B, C, and D in the coordinate system xoy can be obtained by the coordinate transformation, and then the offset direction of the transmitting coil 1 relative to the receiving coil 204 can be determined.

The coordinate transformation model is:

$$\vec{OA}=\vec{OO'}+\vec{O'A}$$

$$\vec{OB}=\vec{OO'}+\vec{O'B}$$

$$\vec{OC}=\vec{OO'}+\vec{O'C}$$

$$\vec{OD}=\vec{OO'}+\vec{O'D}$$

Wherein, o is the origin of the coordinate system xoy, o' is the origin of the coordinate system x'o'y', A, B, C, D are any 4 points on the receiving coil 204, and the second coordinate information of the four points A, B, C, and D is known in the second coordinate system.

Of course, the origin o of the coordinate system xoy may be set at the center of the transmitting coil 1, and meanwhile, the origin of the coordinate system x'o'y' may be set at the center of the receiving coil 204. Then, the position of o' corresponding to the coordinate system xoy may be the offset direction of the transmitting coil 1 with respect to the receiving coil 204.

Figure 4:
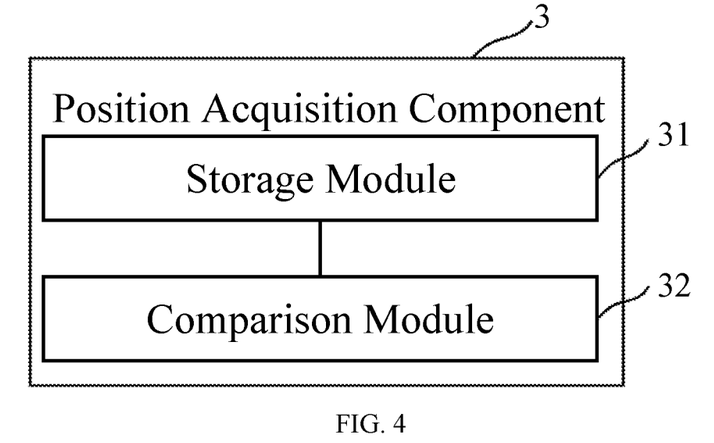
FIG. 4 is a schematic diagram of a position acquisition component of an embodiment of the present disclosure.

As shown in FIG. 4, in an embodiment, the position acquisition component 3 can include a storage module 31 and a comparison module 32, wherein:

the storage module 31 may be configured to store of reference device information of a plurality of the terminals 200 and the position information of the receiving coil 204 of each terminal 200. The reference device information may include at least one of a type of the terminal 200 and a MAC address of the terminal 200, of course, the reference device information may also include other types of information, which are not enumerated herein. The position information of the receiving coil 204 can be referred to the specific description above, and details are again not described herein. It should be noted that the position information of each receiving coil 204 can be in one-to-one correspondence with the reference device information of each terminal 200.

The comparison module 32 can be configured to receive the device information sent by the terminal 200. The device information can be at least one of the type and the MAC address of the terminal 200, and of course, it can also be other types of device information. The comparison module 32 can compare the device information sent by the terminal 200 with the reference device information stored in the storage module 31. When one of the reference device information includes the received device information, the comparison module 32 can read position information of a receiving coil 204 of the terminal 200 corresponding to the reference device information from the storage module 31. Meanwhile, when any of the reference device information does not include the device information sent by the terminal 200, the storage module 31 can store the device information and the position information of the receiving coil 204 sent by the terminal 200 into the storage module 31.

The wireless charging device 100 of an embodiment of the present disclosure may further include a detection component 6 that may be configured to detect the marking component 201 of the terminal 200 and may generate a control signal when the marking component 201 is detected.

In one embodiment, the marking component 201 can be a light-emitting component. Specifically, the marking component 201 can be an LED light, or can be a lighted screen, and of course other types of lights, which are not listed herein. The corresponding detection component 6 can be a photodetection element and, in particular, the detection component 6 can be a photosensor. Of course, the marking component 201 can also be other components, and the corresponding detection component 6 can also be a component capable of detecting the corresponding marking component 201. For example, the marking component 201 can be an infrared transmission component and the corresponding detection component 6 can be an infrared sensor. The type of the detection component 6 is not particularly limited herein as long as the detection component 6 can identify the marking component 201 of the terminal 200 and generate the corresponding control signal.

The control component 5 can be configured to control the driving component 4 to drive the transmitting coil 1 to move according to the position information of the receiving coil 204, the position information of the transmitting coil 1 and the state parameter, until the state parameter is within a preset range.

Specifically, the control component 5 can be disposed in the base and can be configured to respond to the control signal generated by the detection component 6, thereby extracting reference device information from the storage module 31 and obtaining the position information of the receiving coil 204 corresponding to the reference device information and the position information of the transmitting coil 1 in the wireless charging device 100, so that the driving component 4 can be controlled to drive the transmitting coil 1 to move in the opposite direction to the offset direction of the receiving coil 204. During the process, for the convenience of the user, the control component 5 can include a display module that can display state parameters in real time. The state parameter of the transmitting coil 1 can be changed according to the movement of the receiving coil 204. When the state parameter is within a preset range, the transmitting coil 1 can be considered to be aligned with the receiving coil 204, and the control component 5 can control the driving component 4 to stop moving. At this time, the improvement of charging efficiency is apparent.

It should be noted that when the state parameter is the percentage of the power received by the receiving coil 204 and the power transmitted by the transmitting coil 1, the preset range may be between 70% and 100%. Of course, the preset range may also be other ranges. For example, it may be from 60% to 100%, and, of course, it may be other ranges, and will not be enumerated here. In addition, the state parameter may also be a percentage of the current received by the receiving coil 204 and the current transmitted by the transmitting coil 1. Correspondingly, the preset range may be between 70% and 100%. Of course, the preset range may also be other ranges. For example, it may be from 60% to 100%, and of course, it may be other ranges, and will not be enumerated here.

The driving component 4 can be configured to drive the transmitting coil 1 to move. In an embodiment, the driving component 4 can include a plurality of driving units, each of which can drive the transmitting coil 1 to reciprocate in a preset direction, and the preset direction can be any direction, which is not specifically limited here. It should be noted that the plurality of driving units can respectively correspond to different preset directions, so as to realize multi-directional reciprocating motion. For example, the driving component 4 can be a linear motor or other devices capable of driving the movement of the transmitting coil 1, and will not be enumerated here.

Figure 5:
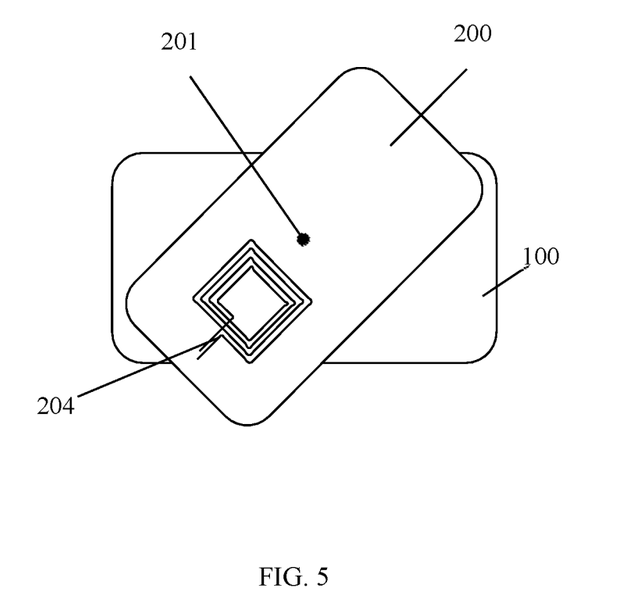
FIG. 5 is a schematic diagram of a charging system of an embodiment of the present disclosure.

The embodiment of the present disclosure further provides a charging system, as shown in FIG. 5, the charging system of the present embodiment may include the wireless charging device 100 according to any of the above embodiments, and the charging system of the embodiment of the present disclosure may further include the terminal 200, which may include a receiving coil 204. The terminal 200 may be a mobile phone, a tablet computer, etc., of course, may be another device or electronic device, and is not particularly limited herein.

Figure 6:
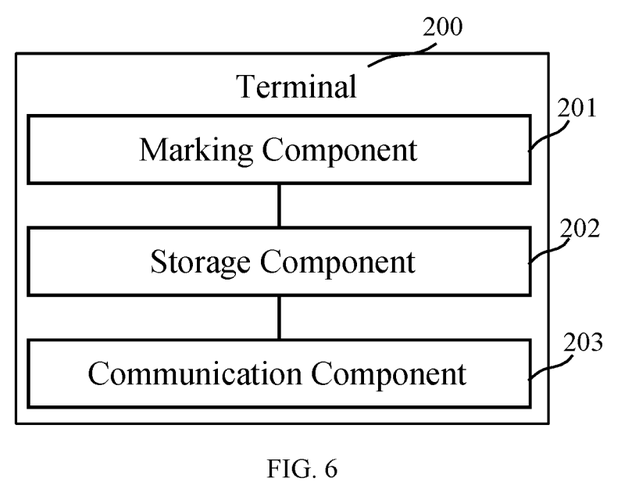
FIG. 6 is a schematic diagram of a terminal according to an embodiment of the present disclosure.

As shown in FIG. 6, the terminal 200 can include a marking component 201, a storage component 202, and a communication component 203, wherein:

the marking component 201 may include at least one of a light emitting element, an infrared transmitting component, and an ultrasonic wave transmitting component, and may of course include other components. The type of the marking component 201 is not particularly limited as long as it can be identified by the detection component 6 of the wireless charging device 100. It should be noted that the light-emitting element may be an LED point light source, or may be a lighted screen, and may of course be other forms, such as a flash lamp.

The storage component 202 can be configured to store the device information and the position information of the receiving coil 204 of the terminal 200, and of course other information can also be stored. The communication component 203 can wirelessly communicate with the wireless charging device 100 and can transmit the device information and the position information of the receiving coil 204 stored in the storage component 202 to the wireless charging device 100.

The wireless charging device of the present disclosure can realize wireless charging by transmitting the power transmitted by the wireless charging device to the terminal through the transmitting coil and the receiving coil of the terminal. During this process, the position information of the receiving coil sent by the terminal and the position information of the transmitting coil can be acquired by the position acquiring component. Also, the control component can control the driving component to drive the transmitting coil to move along a direction close to the receiving coil according to the position information of the receiving coil, the position information of the transmitting coil, and the state parameter collected by the power collection component, thereby reducing a distance of the wireless transmission and the dissipation of energy. When the transmitting coil moves to a state where the state parameter is within a preset range, the charging efficiency can be maintained to be large, thereby improving the charging efficiency and then shortening the charging time.

Other embodiments of the present disclosure will be readily apparent upon consideration of the specification and practice by those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A wireless charging device, comprising:
   a transmitting coil configured to transmit electrical energy to a receiving coil;
   a power collection component configured to acquire a state parameter of the transmitting coil and the receiving coil in a charging state in real time;
   a position acquisition component configured to acquire position information of the receiving coil and position information of the transmitting coil;
   a driving component configured to drive the transmitting coil to move; and
   a control component configured to control the driving component to drive the transmitting coil to move according to the position information of the receiving coil, the position information of the transmitting coil, and the state parameter until the state parameter is within a preset range, wherein the position acquisition component further comprises:
   a storage module configured to store reference device information and position information corresponding to a respective reference piece of device information; and
   a comparison module configured to receive device information, compare the device information with the reference device information, and read the position information of the receiving coil corresponding to the reference device information when one of the reference device information comprises the device information.

2. The wireless charging device of claim 1, wherein the wireless charging device further comprises:
   a detecting component configured to detect a marking component indicating a position of the receiving coil and generate a control signal when the marking component is detected; and
   wherein the control component is configured to determine an offset direction of the transmitting coil relative to the receiving coil according to the position information of the receiving coil and the position information of the transmitting coil in response to the control signal.

3. The wireless charging device of claim 1, wherein the comparison module is configured to acquire the position information of the receiving coil when the device information is not comprised in the reference device information, and store the device information in the storage module to serve as the reference device information corresponding to the position information of the receiving coil.

4. The wireless charging device of claim 2, wherein the marking component is a light emitting element and the detecting component is a photodetecting element.

5. The wireless charging device of claim 1, wherein the state parameter comprises a ratio of a power of the receiving coil to power of the transmitting coil.

6. The wireless charging device of claim 5, wherein the preset range is 70% to 100%.

7. The wireless charging device of claim 1, wherein controlling the driving component to drive the transmitting coil to move according to the position information of the receiving coil, the position information of the transmitting coil, and the state parameter until the state parameter is within the preset range comprises:
   determining an offset direction of the transmitting coil relative to the receiving coil according to the position information of the receiving coil and the position information of the transmitting coil; and
   controlling the driving component to drive the transmitting coil to move along an opposite direction of the offset direction until the state parameter is within the preset range.

8. The wireless charging device of claim 7, wherein:
   the position information of the receiving coil comprises first coordinate information of the receiving coil in a first preset coordinate system;
   the position information of the transmitting coil comprises second coordinate information of the transmitting coil in a second preset coordinate system; and
   determining the offset direction of the transmitting coil relative to the receiving coil according to the position information of the receiving coil and the position information of the transmitting coil comprises:
   determining the offset direction of the transmitting coil relative to the receiving coil according to the first coordinate information, the second coordinate information, and a positional relationship between the first preset coordinate system and the second preset coordinate system direction.

9. The wireless charging device of claim 8, wherein an origin of the first preset coordinate system is located at a center of the receiving coil, and an origin of the second preset coordinate system is located at the center of the transmitting coil.

10. A charging system, comprising:
    a terminal comprising a receiving coil; and
    a wireless charging device, the wireless charging device comprising:
    a transmitting coil configured to transmit electrical energy to the receiving coil;
    a power collection component configured to acquire a state parameter of the transmitting coil and the receiving coil in a charging state in real time;

a position acquisition component configured to acquire position information of the receiving coil sent by the terminal and position information of the transmitting coil;

a driving component configured to drive the transmitting coil to move; and a control component configured to control the driving component to drive the transmitting coil to move according to the position information of the receiving coil, the position information of the transmitting coil, and the state parameter until the state parameter is within a preset range, wherein the position acquisition component further comprises:

a storage module configured to store reference device information of a plurality of terminals and position information of a receiving coil of each of the terminals; and a comparison module, configured to receive device information sent by one of the plurality of terminals, compare the device information with the reference device information, and read position information of a receiving coil corresponding to the reference device information when one of the reference device information comprises the device information.

11. The charging system of claim 10, wherein:
the terminal comprises a marking component; and
the wireless charging device further comprises:
a detecting component configured to detect the marking component and generate a control signal when the marking component is detected; and
wherein the control component is configured to determine an offset direction of the transmitting coil relative to the receiving coil according to the position information of the receiving coil and the position information of the transmitting coil in response to the control signal.

12. The charging system of claim 10, wherein:
the comparison module is configured to acquire the position information of the receiving coil sent by the terminal when the device information is not comprised in the reference device information; and
store the device information in the storage module to serve as the reference device information corresponding to the terminal.

13. The charging system of claim 11, wherein the marking component is a light emitting element and the detecting component is a photodetecting element.

14. The charging system of claim 10, wherein the state parameter comprises a ratio of a power of the receiving coil to a power of the transmitting coil.

15. The charging system of claim 14, wherein the preset range is 70% to 100%.

16. The charging system of claim 10, wherein controlling the driving component to drive the transmitting coil to move according to the position information of the receiving coil, the position information of the transmitting coil, and the state parameter, until the state parameter is within a preset range comprises:

determining an offset direction of the transmitting coil relative to the receiving coil according to the position information of the receiving coil and the position information of the transmitting coil; and controlling the driving component to drive the transmitting coil to move along an opposite direction of the offset direction until the state parameter is within the preset range.

17. The charging system of claim 16, wherein:
the position information of the receiving coil comprises first coordinate information of the receiving coil in a first preset coordinate system;
the position information of the transmitting coil comprises second coordinate information of the transmitting coil in a second preset coordinate system; and
determining the offset direction of the transmitting coil relative to the receiving coil according to the position information of the receiving coil and the position information of the transmitting coil comprises:
determining the offset direction of the transmitting coil relative to the receiving coil according to the first coordinate information, the second coordinate information, and a positional relationship between the first preset coordinate system and the second preset coordinate system direction.

18. The charging system of claim 17, wherein an origin of the first preset coordinate system is located at a center of the receiving coil, and the origin of the second preset coordinate system is located at the center of the transmitting coil.

* * * * *